United States Patent
Wang et al.

(10) Patent No.: US 10,049,992 B2
(45) Date of Patent: Aug. 14, 2018

(54) TERNARY PUF UNIT AND CIRCUIT REALIZED BY CNFET

(71) Applicant: Ningbo University, Zhejiang (CN)

(72) Inventors: Pengjun Wang, Zhejiang (CN); Daohui Gong, Zhejiang (CN); Huihong Zhang, Zhejiang (CN); Yaopeng Kang, Zhejiang (CN)

(73) Assignee: Ningbo University, Zhejiang (CN)

( * ) Notice: Subject to any disclaimer, the term of this patent is extended or adjusted under 35 U.S.C. 154(b) by 0 days.

(21) Appl. No.: 15/687,538

(22) Filed: Aug. 27, 2017

(65) Prior Publication Data

US 2018/0166400 A1    Jun. 14, 2018

(30) Foreign Application Priority Data

Dec. 8, 2016 (CN) .......................... 2016 1 1119524

(51) Int. Cl.
*H01L 23/00* (2006.01)
*H01L 27/28* (2006.01)
*H04L 9/32* (2006.01)

(52) U.S. Cl.
CPC .......... *H01L 23/576* (2013.01); *H01L 27/283* (2013.01); *H04L 9/3278* (2013.01)

(58) Field of Classification Search
None
See application file for complete search history.

(56) References Cited

U.S. PATENT DOCUMENTS 9,774,327 B1 * 9/2017 Wang ............... H03K 19/00315
2016/0268512 A1 * 9/2016 Wang ................. H01L 51/0048
(Continued)

OTHER PUBLICATIONS

Vijayakumar et al., "A Novel Modeling Attack Resistant PUF Design Based on Non-linear Voltage Transfer Characteristics," 2015 Design, Automation & Test in Europe Conference &Exhibition(DATE), Mar. 2015, pp. 653-658.
(Continued)

*Primary Examiner* — Jany Richardson
(74) *Attorney, Agent, or Firm* — JCIPRNET

(57) ABSTRACT

The present invention discloses a ternary PUF unit and circuit realized by CNFET; the ternary PUF circuit comprises a ternary row decoder, a ternary column decoder, a ternary output circuit and a ternary PUF unit array; the said ternary PUF circuit is arranged into a $3^n$ rows×$3^n$ columns matrix formed by $3^n$×$3^n$ ternary PUF units; the ternary PUF unit comprises a $1^{st}$ CNFET transistor, a $2^{nd}$ CNFET transistor, a $3^{rd}$ CNFET transistor, a $4^{th}$ CNFET transistor, a $5^{th}$ CNFET transistor, a $6^{th}$ CNFET transistor, a $7^{th}$ CNFET transistor, an $8^{th}$ CNFET transistor, a $9^{th}$ CNFET transistor and a $10^{th}$ CNFET transistor; its advantage lies in the fact that it is provided with small circuit area and higher randomness and uniqueness while ensuring proper logic function.

2 Claims, 6 Drawing Sheets

(56) References Cited

U.S. PATENT DOCUMENTS

2017/0180140 A1* 6/2017 Mai ..................... H04L 9/3278
2017/0373862 A1* 12/2017 Holcomb ................ G09C 1/00

OTHER PUBLICATIONS

Lim et al., "Extracting Secret Keys From Integrated Circuits," IEEE Transactions on Very Large Scale Integration (VLSI) Systems, Oct. 2005, pp. 1200-1205.
Lao et al., "Statistical Analysis of MUX-Based Physical Unclonable Functions," IEEE Transactions on Computer-Aided Design of Integrated Circuits and Systems, May 2014, pp. 649-662.
Su et al., "A Digital 1.6 pJ/bit Chip Identification Circuit Using Process Variations," IEEE Journal of Solid-State Circuits, Jan. 2008, pp. 69-77.
Chellappa et al., "SRAM-Based Unique Chip Identifier Techniques," IEEE Transactions on Very Large Scale Integration (VLSI) Systems, Apr. 2016, pp. 1213-1222.
Suh et al., "Physical Unclonable Functions for Device Authentication and Secret Key Generation," ACM/IEEE Design Automation Conference, Jun. 2007, pp. 9-14.
Cao et al., "A Low-Power Hybrid RO PUF With Improved Thermal Stability for Lightweight Applications," IEEE Transactions on Computer-Aided Design of Integrated Circuits and Systems, Jul. 2015, pp. 1143-1147.

* cited by examiner

TERNARY PUF UNIT AND CIRCUIT REALIZED BY CNFET

CROSS-REFERENCE TO RELATED APPLICATION

This application claims the priority benefit of China application no. 201611119524.8, filed on Dec. 8, 2016. The entirety of the abovementioned patent application is hereby incorporated by reference herein and made a part of this specification.

FIELD OF THE INVENTION

The present invention is related a Physical Unclonable Function (PUF) unit, in particular to a ternary PUF unit and circuit realized by Carbon Nanotube Field Effect Transistor (CNFET).

BACKGROUND ART

Physical Unclonable Function (PUF) makes use of random process variations during manufacturing of integrated circuit to produce cipher for application to the password system. Due to random process variations, different chips of the same structure may obtain different output responses under the same excitation. The attacker is unable to clone the PUF circuit with identical output response due to uncontrollable process variations despite of the fact that the attacker knows structure of the PUF circuit. PUF circuit can defense numerous conventional attacks owing to its unclonable properties. Pappu and his colleagues proposed the concept of PUF firstly, and designed an optical PUF to realize such applications as system certification. Later, Gassend and his colleagues proposed PUF circuit based on the conception of random functions for silicon parameters. Therefore, study and application of PUF circuit have become more and more extensive, such as protection of intellectual property rights, equipment certification, hardware identification and cipher generation.

In the silicon PUF circuit, such problems as gate time delay and interconnect crosstalk brought forth by parasitic effect of interconnecting line will become more and more serious once the characteristic dimension is reduced to the nanometer scale. Uniqueness of PUF circuit represents the capability in differentiating different chips of the same structure; whereas randomness may affect the intensity of unclonable property of the circuit; therefore, it is of vital importance to improve randomness and uniqueness of PUF circuit. Carbon Nano transistor (CNT) is provided with ballistic transmission performance owing to extremely long free path of its elastic scattering. As compared with 3D silicon and Silicon-On-Insulator CNT of quasi one-dimension structure has higher electronic control capability. Carbon Nanotube Field Effect Transistor (CNFET) takes CNT as conducting channel; PUF circuit as designed based on CNFET is provided with better randomness and uniqueness. In PUF circuit, it is applicable to improve complexity of cipher by increasing the quantity of challenge-response pairs (CRPs). For binary PUF circuit, increased quantity of challenge-response pairs will inevitably increase the area of chips. As compared with binary logic ternary logic can take the signal value of "0", "1" and "2"; for PUF circuit of the same n bit, the quantity of challenge-response pairs of ternary PUF circuit is times $(1.5)^n$ of that of binary PUF circuit.

Thus, it is of vital importance to design a CNFET based ternary PUF unit and circuit featuring in smaller area of circuit and excellent randomness and uniqueness in combination with CNFET and ternary logic technology while maintaining the correct logic functions.

SUMMARY OF THE INVENTION

The technical issue to be settled by the present invention is to provide a CNFET based ternary PUF unit and circuit featuring in smaller area of circuit and excellent randomness and uniqueness while maintaining the correct logic functions.

A technical solution used by the present invention to settle aforesaid technical issue is stated as follows: A CNFET based ternary PUF unit, comprising the $1^{st}$ CNFET transistor, the $2^{nd}$ CNFET transistor, the $3^{rd}$ CNFET transistor, the $4^{th}$ CNFET transistor, the $5^{th}$ CNFET transistor, the $6^{th}$ CNFET transistor, the $7^{th}$ CNFET transistor, the $8^{th}$ CNFET transistor, the $9^{th}$ CNFET transistor and the $10^{th}$ CNFET transistor; the CNFET transistor, the $3^{rd}$ CNFET transistor, the $4^{th}$ CNFET transistor, the $5^{th}$ CNFET transistor, the $7^{th}$ CNFET transistor and the $8^{th}$ CNFET transistor belong to N CNFET transistors; the $2^{nd}$ CNFET transistor, the $6^{th}$ CNFET transistor, the $9^{th}$ CNFET transistor and the $10^{th}$ CNFET transistor belong to P CNFET transistors; gate of the $1^{st}$ CNFET transistor is connected to the gate of the $8^{th}$ CNFET transistor, and the connecting terminal is the numerical line control signal input terminal of the said ternary PUF unit; drain of the $1^{st}$ CNFET transistor, gate of the $2^{nd}$ CNFET transistor, gate of the $3^{rd}$ CNFET transistor, source of the $5^{th}$ CNFET transistor, drain of the $6^{th}$ CNFET transistor and drain of the $7^{th}$ CNFET transistor are connected to the drain of the $9^{th}$ CNFET transistor; source of the $1^{st}$ CNFET transistor is the inverted output of the said ternary PUF unit; source of the $2^{nd}$ CNFET transistor, source of the $9^{th}$ CNFET transistor, source of the $10^{th}$ CNFET transistor, source of the $6^{th}$ CNFET transistor and gate of the $4^{th}$ CNFET transistor is connected to the gate of the $5^{th}$ CNFET transistor, and the connecting terminal is connected to the $1^{st}$ power source; drain of the $2^{nd}$ CNFET transistor, drain of the $3^{rd}$ CNFET transistor, source of the $4^{th}$ CNFET transistor, drain of the $10^{th}$ CNFET transistor, gate of the $6^{th}$ CNFET transistor and gate of the $7^{th}$ CNFET transistor is connected to the drain of the $8^{th}$ CNFET transistor; source of the $3^{rd}$ CNFET transistor and source of the $7^{th}$ CNFET transistor are grounded; drain of the $4^{th}$ CNFET transistor is connected to the drain of the $5^{th}$ CNFET transistor, and the connecting terminal is connected to the $2^{nd}$ power source; the $2^{nd}$ power source is equivalent to half of the $1^{st}$ power source; source of the $8^{th}$ CNFET transistor is the output terminal of the said ternary PUF unit; gate of the $9^{th}$ CNFET transistor is connected to the gate of the $10^{th}$ CNFET transistor, and the connecting terminal is the enabling terminal of the said ternary PUF unit.

As compared with prior arts, advantage of the ternary unit according to the present invention is stated as follows: as indicated by study of circuit of Carbon Nanotube Field Effect Transistor (CNFET) and Physical Unclonable Functions (PUF), the $2^{nd}$ CNFET transistor, the $3^{rd}$ CNFET transistor, the $4^{th}$ CNFET transistor, the $5^{th}$ CNFET transistor, the $6^{th}$ CNFET transistor and the $7^{th}$ CNFET transistor form a cross-coupling inverter; variations current as incurred by the cross-coupling inverter due to process variations can amplify the minor current variations through the positive feedback of the cross-coupling to obtain a stable output value; furthermore, data on storage node is to be read through the $1^{st}$ CNFET transistor and the $8^{th}$ CNFET transistor; the $9^{th}$ CNFET transistor and the $10^{th}$ CNFET transistor form a pre-charge circuit; the storage node is to be pre-charged as high level through the $1^{st}$ power source Vdd at the pre-charge stage; at the pre-charge stage, the word-line control signal input via the word-line control signal input terminal of the ternary PUF unit is at lower level; the $1^{st}$ CNFET transistor and the $8^{th}$ CNFET transistor are closed; the enabling signal input via the enabling terminal of the ternary PUF is at low level; the $9^{th}$ CNFET transistor and the $10^{th}$ CNFET transistor are conductive, and the storage node is pre-charged as high level, namely the logic value "2"; at the evaluation stage, enabling signal input via the enabling terminal of the ternary PUF unit is at high level; the $9^{th}$ CNFET transistor and the $10^{th}$ CNFET transistor are closed; competitive power of two of cross-coupling inverts formed by the $2^{nd}$ CNFET transistor, the $3^{rd}$ CNFET transistor, the $4^{th}$ CNFET transistor, the $5^{th}$ CNFET transistor, the $6^{th}$ CNFET transistor and the $7^{th}$ CNFET transistor is varied due to process variations; eventually, the storage node is maintained at a certain logic value; the minimum time as required by competition between two inverters and stabilization of the storage node is called setting time; as verified by experiments, setting time of the ternary PUF unit according to the present invention is 0.1 ns; the setting time is relatively short; smaller area of circuit can ensure better randomness and uniqueness on condition that correct logic function can be maintained.

The second technical issue to be settled by the present invention is to provide a ternary PUF circuit realized by CNFET of smaller area of circuit and better randomness and uniqueness based on correct logic function.

The second technical solution used by the present invention to settle aforesaid technical issue is stated as follows: A CNFET based ternary PUF circuit, comprising a ternary row decoder, a ternary column decoder, a ternary output circuit and a ternary PUF unit array; the said ternary PUF unit array comprises $3^n \times 3^n$ ternary PUF units arranged in a $3^n$ rows$\times 3^n$ columns matrix; n is an integral $\geq 1$; the ternary row decoder is provided with n input terminals and $3^n$ output terminals; the said ternary column decoder is provided with n input terminals and $3^n$ output terminals; the said ternary output circuit is provided with $3^n \times 3^n$ input terminals, $3^n \times 3^n$ inverted input terminals and $2 \times 3^n$ output terminals; the said ternary PUF unit comprises the $1^{st}$ CNFET transistor, the $2^{nd}$ CNFET transistor, the $3^{rd}$ CNFET transistor, the $4^{th}$ CNFET transistor, the $5^{th}$ CNFET transistor, the $6^{th}$ CNFET transistor, the $7^{th}$ CNFET transistor, the $8^{th}$ CNFET transistor, the $9^{th}$ CNFET transistor and the $10^{th}$ CNFET transistor; the CNFET transistor, the $3^{rd}$ CNFET transistor, the $4^{th}$ CNFET transistor, the $5^{th}$ CNFET transistor, the $7^{th}$ CNFET transistor and the $8^{th}$ CNFET transistor belong to N CNFET transistors; the $2^{nd}$ CNFET transistor, the $6^{th}$ CNFET transistor, the $9^{th}$ CNFET transistor and the $10^{th}$ CNFET transistor belong to P CNFET transistors; gate of the $1^{st}$ CNFET transistor is connected to the gate of the $8^{th}$ CNFET transistor, and the connecting terminal is the numerical line control signal input terminal of the said ternary PUF unit; drain of the $1^{st}$ CNFET transistor, gate of the $2^{nd}$ CNFET transistor, gate of the $3^{rd}$ CNFET transistor, source of the $5^{th}$ CNFET transistor, drain of the $6^{th}$ CNFET transistor and drain of the $7^{th}$ CNFET transistor is connected to the drain of the $9^{th}$ CNFET transistor; source of the $1^{st}$ CNFET transistor is the inverted output terminal of the said ternary PUF unit; source of the $2^{nd}$ CNFET transistor, source of the $9^{th}$ CNFET transistor, source of the $10^{th}$ CNFET transistor, source of the $6^{th}$ CNFET transistor and gate of the $4^{th}$ CNFET transistor are connected to the gate of the $5^{th}$ CNFET transistor, and the connecting terminal is connected to the $1^{st}$ power source; drain of the $2^{nd}$ CNFET transistor, drain of the $3^{rd}$ CNFET transistor, source of the $4^{th}$ CNFET transistor, drain of the $10^{th}$ CNFET transistor, gate of the $6^{th}$ CNFET transistor and gate of the $7^{th}$ CNFET transistor are connected to the drain of the $8^{th}$ CNFET transistor; source of the $3^{rd}$ CNFET transistor and source of the $7^{th}$ CNFET transistor are grounded; drain of the $4^{th}$ CNFET transistor is connected to the drain of the $5^{th}$ CNFET transistor, and the connecting terminal is connected to the $2^{nd}$ power source; the $2^{nd}$ power source is equivalent to half of the $1^{st}$ power source; source of the $8^{th}$ CNFET transistor is the output terminal of the said ternary PUF unit; gate of the $9^{th}$ CNFET transistor is connected to the gate of the $10^{th}$ CNFET transistor, and the connecting terminal is the enabling terminal of the said ternary PUF unit; numerical line control signal input terminal of the said ternary PUF unit in row j is connected to the output terminal j of the said ternary row decoder; numerical line control signal input terminal of the said ternary PUF unit in array j is connected to the output terminal j of the said ternary column decoder, j=1, 2, . . . , $3^n$; $3^n \times 3^n$ output terminals of said ternary PUF unit are in corresponding connection with $3^n \times 3^n$ input terminals of the said ternary output circuit; $3^n \times 3^n$ inverted output terminals of the said ternary PUF unit are in corresponding connection with $3^n \times 3^n$ inverted input terminals of the said output circuit.

As compared with prior arts, the ternary PUF circuit according to the present invention has the following advantage: the ternary PUF units in the ternary PUF unit array form a cross-coupling inverter via the $2^{nd}$ CNFET transistor, the $3^{rd}$ CNFET transistor, the $4^{th}$ CNFET transistor, the $5^{th}$ CNFET transistor, the $6^{th}$ CNFET transistor and the $7^{th}$ CNFET transistor; the variations current is incurred by the cross-coupling inverter due to process variations; the random and unclonable ternary output signals "0", "1" and "2" are obtained through current competition of the ternary PUF unit; HSPICE in the 32 nm CNFET standard model base is used for Monte Carlo simulation of the ternary PUF circuit according to the present invention for analysis of its performance as randomness and uniqueness; as indicated by simulation results, randomness of the ternary PUF circuit according to the present invention is 33.21%, which is extremely approximate to the ideal value of 33.33%; whereas, uniqueness is 66.75%, which is almost equal to the ideal value of 66.66%; therefore, it is provided with higher randomness and uniqueness; smaller area of circuit can ensure better randomness and uniqueness on condition that correct logic function can be maintained.

DESCRIPTION OF EMBODIMENTS

The present invention discloses a ternary PUF unit realized by CNFET; the ternary PUF unit realized by CNFET according to the present invention is further described as follows in combination with embodiments to drawings.

Figure 1:
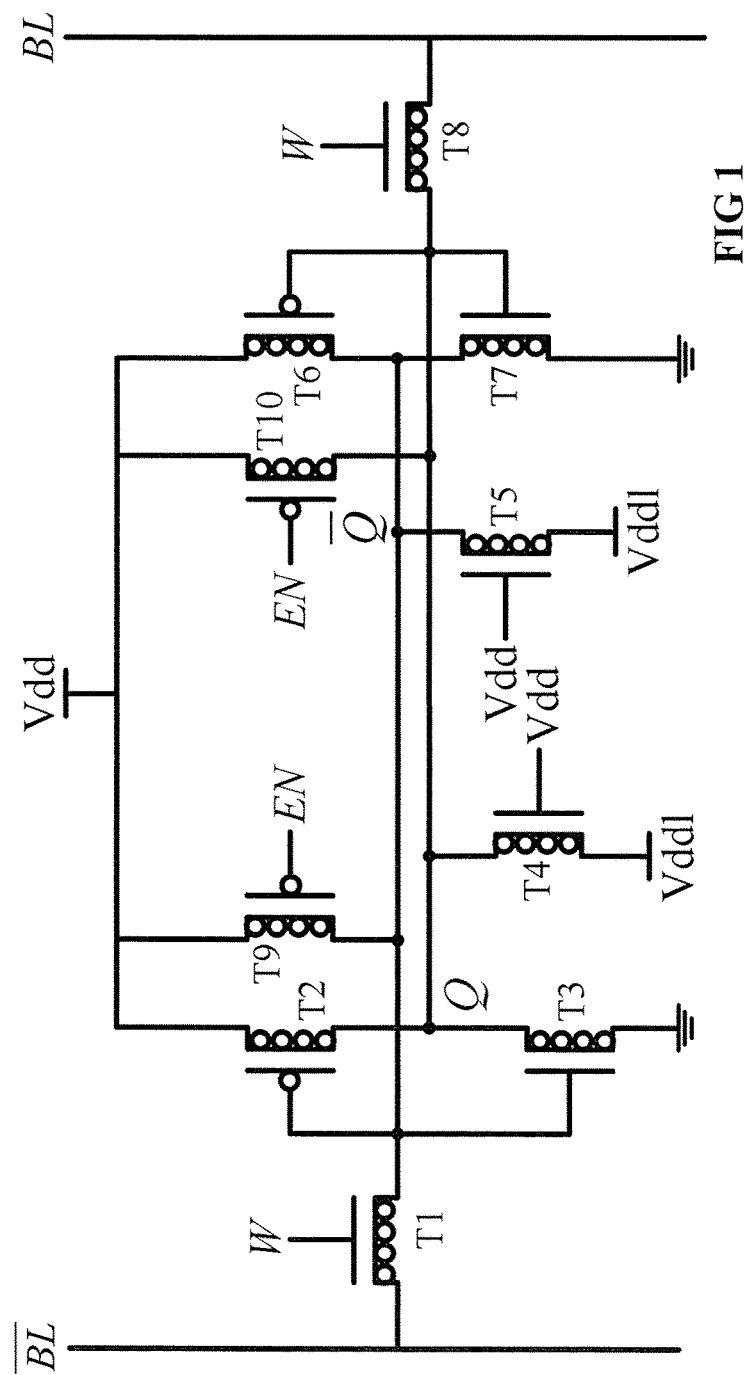
FIG. 1 is the circuit diagram for the ternary PUF unit realized by CNFET according to the present invention.

Embodiment: A ternary PUF unit realized by CNFET as shown in FIG. 1 comprising the 1st CNFET transistor T1, the 2nd CNFET transistor T2, the 3rd CNFET transistor T3, the 4th CNFET transistor T4, the 5th CNFET transistor T5, the 6th CNFET transistor T6, the 7th CNFET transistor T7, the 8th CNFET transistor T8, the 9th CNFET transistor T9 and the 10th CNFET transistor T10; the 1st CNFET transistor T1, the 3rd CNFET transistor T3, the 4th CNFET transistor T4, the 5th CNFET transistor T5, the 7th CNFET transistor T7 and the 8th CNFET transistor T8 belong to N CNFET transistors; the 2nd CNFET transistor T2, the 6th CNFET transistor T6, the 9th CNFET transistor T9 and the 10th CNFET transistor T10 belong to P CNFET transistors; gate of the 1st CNFET transistor T1 is connected to the gate of the 8th CNFET transistor T8, and the connecting terminal is the numerical line control signal input terminal of the said ternary PUF unit; drain of the 1st CNFET transistor T1, gate of the 2nd CNFET transistor T2, gate of the 3rd CNFET transistor T3, source of the 5th CNFET transistor T5, drain of the 6th CNFET transistor T6 and drain of the 7th CNFET transistor T7 are connected to the drain of the 9th CNFET transistor T9; source of the 1st CNFET transistor T1 is the inverted output of the said ternary PUF unit; source of the 2nd CNFET transistor T2, source of the 9th CNFET transistor T9, source of the 10th CNFET transistor T10, source of the 6th CNFET transistor T6 and gate of the 4th CNFET transistor T4 is connected to the gate of the 5th CNFET transistor T5, and the connecting terminal is connected to the 1st power source Vdd; drain of the 2nd CNFET transistor T2, drain of the 3rd CNFET transistor T3, source of the 4th CNFET transistor T4, drain of the 10th CNFET transistor T10, gate of the 6th CNFET transistor T6 and gate of the 7th CNFET transistor T7 is connected to the drain of the 8th CNFET transistor T8; source of the 3rd CNFET transistor T3 and source of the 7th CNFET transistor T7 are grounded; drain of the 4th CNFET transistor T4 is connected to the drain of the 5th CNFET transistor T5, and the connecting terminal is connected to the 2nd power source Vdd1; the 2nd power source Vdd1 is equivalent to half of the 1st power source Vdd; source of the 8th CNFET transistor T8 is the output terminal of the said ternary PUF unit; gate of the 9th CNFET transistor T9 is connected to the gate of the 10th CNFET transistor T10, and the connecting terminal is the enabling terminal of the said ternary PUF unit.

In the ternary PUF unit realized by CNFET according to the present invention, the $2^{nd}$ CNFET transistor T2, the $3^{rd}$ CNFET transistor T3, the $4^{th}$ CNFET transistor T4, the $5^{th}$ CNFET transistor T5, the $6^{th}$ CNFET T6 transistor and the $7^{th}$ CNFET transistor T7 form a cross-coupling inverter; variations current as incurred by the cross-coupling inverter due to process variations can amplify the minor current variations through the positive feedback of the cross-coupling to obtain a stable output value; furthermore, data on storage node Q and $\overline{Q}$ is to be read through the $1^{st}$ CNFET transistor T1 and the $8^{th}$ CNFET transistor T8; the $9^{th}$ CNFET transistor T9 and the $10^{th}$ CNFET transistor T10 form a pre-charge circuit; at the pre-charge stage, node Q and $\overline{Q}$ is to be pre-charged as high level via the $1^{st}$ power source Vdd.

Figure 2:
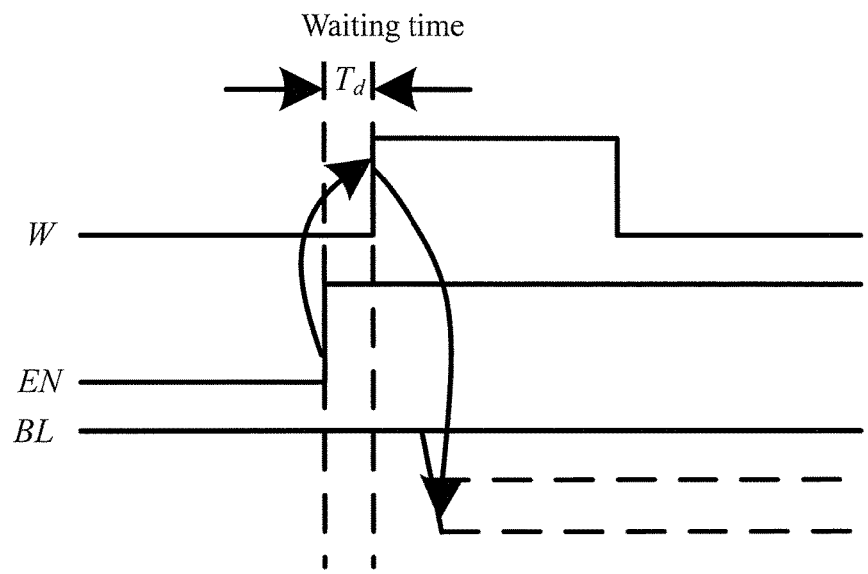
FIG. 2 is the working sequence chart for the ternary PUF unit realized by CNFET according to the present invention.

The ternary PUF unit realized by CNFET according to the present invention is divided into two stages, namely pre-charge stage and evaluation stage; the working sequence is as shown in FIG. 2. At the pre-charge stage, the word-line control signal W input from the word-line control sign input terminal of the ternary PUF unit is at low level; the $1^{st}$ CNFET transistor T1 and the $8^{th}$ CNFET transistor T8 are closed; the enabling signal input from the enabling terminal of the ternary PUF unit is at low level; the $9^{th}$ CNFET transistor T9 and the $10^{th}$ CNFET transistor T10 are conductive; node Q and $\overline{Q}$ are pre-charged as high level; in other words, the logic value is "2". At the evaluation stage, enabling signal EN input from the enabling terminal of the ternary PUF unit is at high level; the $9^{th}$ CNFET transistor T9 and the $10^{th}$ CNFET transistor T10 are closed; due to process variations, competitive power of two of cross-coupling inverters formed by the $2^{nd}$ CNFET transistor T2, the $3^{rd}$ CNFET transistor T3, the $4^{th}$ CNFET transistor T4, the $5^{th}$ CNFET transistor T5, the $6^{th}$ CNFET transistor T6 and the $7^{th}$ CNFET transistor T7 is varied; eventually, node Q and $\overline{Q}$ are maintained at a certain logic value; the minimum time from competition between two inverters to stabilization of node Q and $\overline{Q}$ is called setting time $T_s$; therefore, there will be a certain period of waiting time $T_d$ before the enabling signal EN as input from the enabling terminal of the ternary PUF unit is pre-charged as high level, and the data is read; the ternary PUF unit can work normally only on condition that waiting time $T_d$ exceeds the setting time $T_s$; once the waiting time $T_d$ is over, W will be at a high level, and the $1^{st}$ CNFET transistor T1 and the $8^{th}$ CNFET transistor T8 will be conductive; the data produced through competition between the two cross-coupling inverters is to be read to obtain the output response Bl and $\overline{BL}$.

Figure 3:
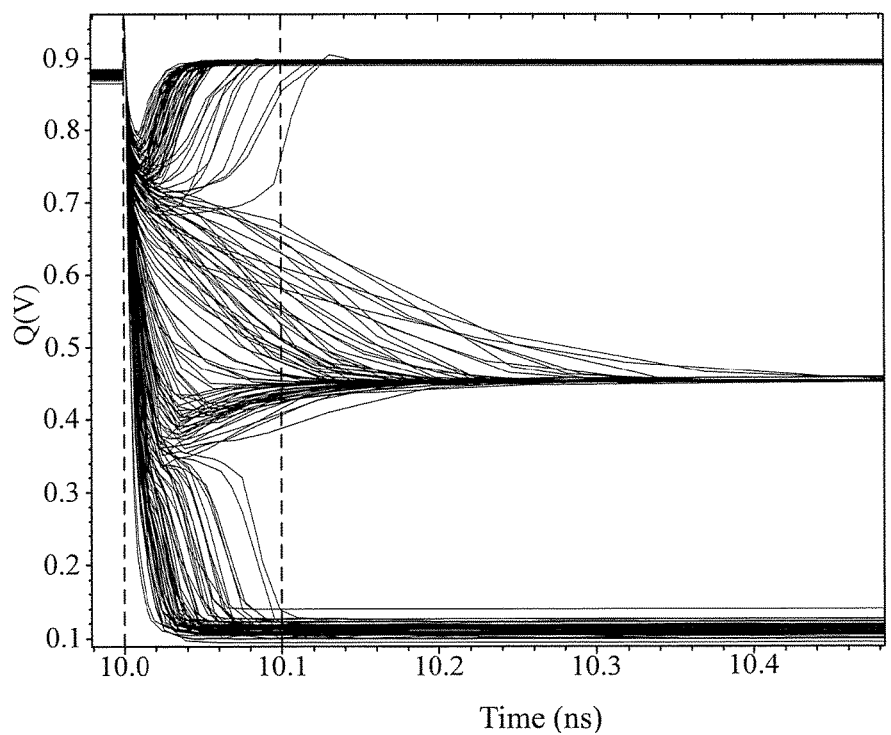
FIG. 3 is the Monte Carlo simulation diagram for ternary PUF unit realized by CNFET according to the present invention.
Figure 4:
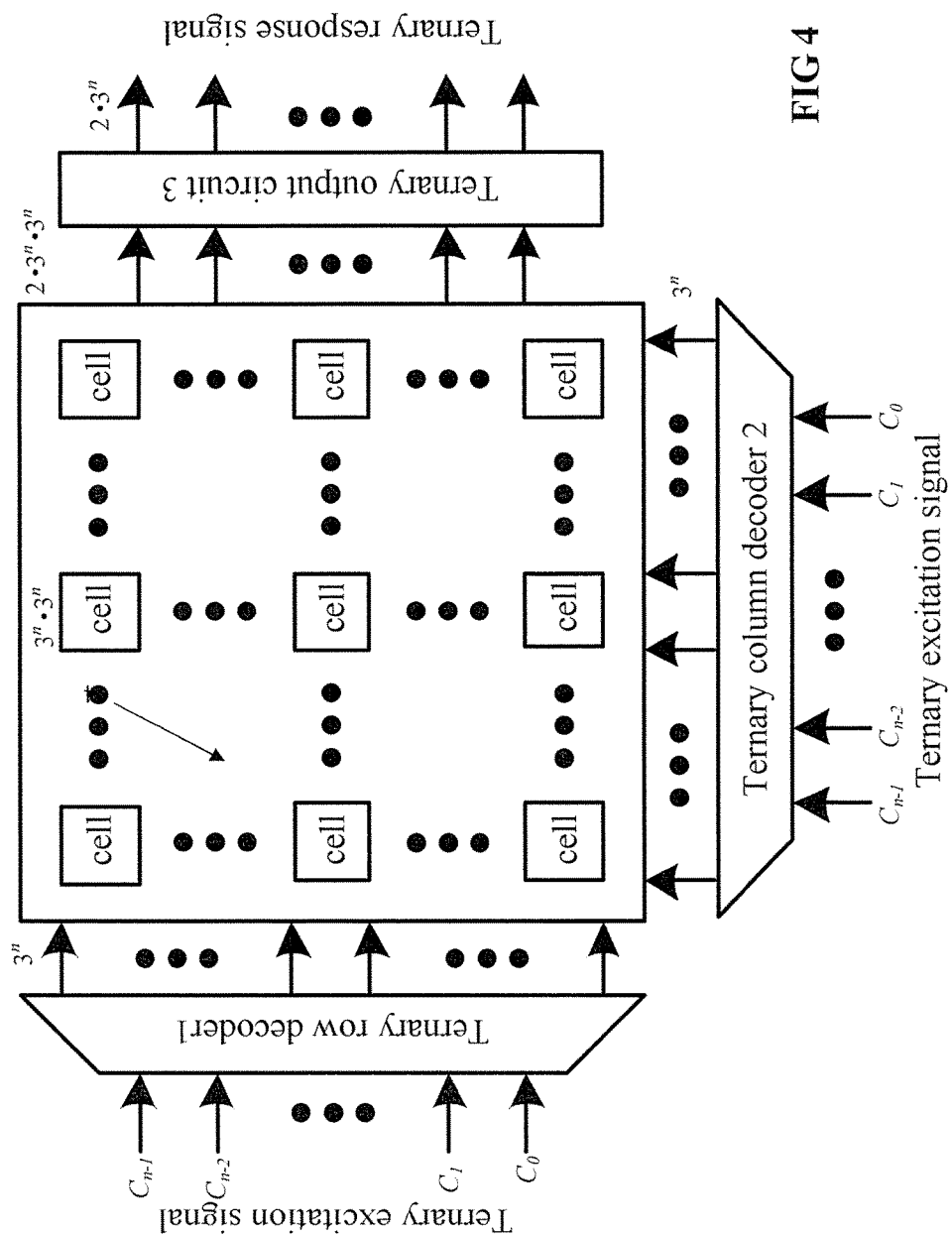
FIG. 4 is the circuit diagram for the ternary PUF circuit realized by CNFET according to the present invention.

Viewing from working sequence chart of the ternary PUF unit as shown in FIG. 2, it can be seen that the waiting time $T_d$ shall exceed the setting time from competition between the two cross-coupling ternary inverters to stabilization of the data; otherwise, it may result in incorrect data as read. Monte Carlo simulation chart of the ternary PUF unit realized by CNFET according to the present invention is as shown in FIG. 3. According to analysis of FIG. 3, $T_s$ of the ternary PUF unit according to the present invention is 0.1 ns; therefore, $T_s$, is relatively small.

The present invention discloses a ternary PUF circuit realized by CNFET; the ternary PUF circuit realized by CNFET according to the present invention is further described as follows in combination with embodiments to drawings.

Embodiment 1: A ternary PUF circuit realized by CNFET as shown in FIG. 1-4, comprising a ternary row decoder1, a ternary column decoder 2, a ternary output circuit 3 and a ternary PUF unit array 4; the said thee-value PUF unit array 4 comprises $3''\times3''$ ternary PUF units arranged in a $3''$ rows×$3''$ columns matrix; n is an integral ≥1; the said ternary row decoder1 is provided with n input terminals and $3''$ output terminals; the said ternary column decoder 2 is provided with n input terminals and $3''$ output terminals; the said ternary output circuit 3 is provided with $3''\times3''$ input terminals, $3''\times3''$ inverted input terminals and $2\times3''$ output terminals; the said ternary PUF unit comprises the 1st CNFET transistor T1, the 2nd CNFET transistor T2, the 3rd CNFET transistor T3, the 4th CNFET transistor T4, the 5th CNFET transistor T5, the 6th CNFET transistor T6, the 7th CNFET transistor T7, the 8th CNFET transistor T8, the 9th CNFET transistor T9 and the 10th CNFET transistor T10; the 1st CNFET transistor T1, the 3rd CNFET transistor T3, the 4th CNFET transistor T4, the 5th CNFET transistor T5, the 7th CNFET transistor T7 and the 8th CNFET transistor T8 belong to N CNFET transistors; the 2nd CNFET transistor T2, the 6th CNFET transistor T6, the 9th CNFET transistor T9 and the 10th CNFET transistor T10 belong to P CNFET transistors; gate of the 1st CNFET transistor T1 is connected to the gate of the 8th CNFET transistor T8, and the connecting terminal is the numerical line control signal input terminal of the said ternary PUF unit; drain of the 1st CNFET transistor T1, gate of the 2nd CNFET transistor T2, gate of the 3rd CNFET transistor T3, source of the 5th CNFET transistor T5, drain of the 6th CNFET transistor T6 and drain of the 7th CNFET transistor T7 is connected to the drain of the 9th CNFET transistor T9; source of the 1st CNFET transistor T1 is the inverted output terminal of the said ternary PUF unit; source of the 2nd CNFET transistor T2, source of the 9th CNFET transistor T9, source of the 10th CNFET transistor T10, source of the 6th CNFET transistor T6 and gate of the 4th CNFET transistor T4 are connected to the gate of the 5th CNFET transistor T5, and the connecting terminal is connected to the 1st power source Vdd; drain of the 2nd CNFET transistor T2, drain of the 3rd CNFET transistor T3, source of the 4th CNFET transistor T4, drain of the 10th CNFET transistor T10, gate of the 6th CNFET transistor T6 and gate of the 7th CNFET transistor T7 are connected to the drain of the 8th CNFET transistor T8; source of the 3rd CNFET transistor T3 and source of the 7th CNFET transistor T7 are grounded; drain of the 4th CNFET transistor T4 is connected to the drain of the 5th CNFET transistor T5, and the connecting terminal is connected to the 2nd power source vdd1; the 2nd power source vdd1 is equivalent to half of the 1st power source Vdd; source of the 8th CNFET transistor T8 is the output terminal of the said ternary PUF unit; gate of the 9th CNFET transistor T9 is connected to the gate of the 10th CNFET transistor T10, and the connecting terminal is the enabling terminal of the said ternary PUF unit; numerical line control signal input terminal of the said ternary PUF unit in row j is connected to the output terminal j of the said ternary row decoder1; numerical line control signal input terminal of the said ternary PUF unit in column j is connected to the output terminal j of the said ternary column decoder 2, j=1, 2, . . . , $3^n$; $3^n \times 3^n$ output terminals of said ternary PUF unit are in corresponding connection with $3^n \times 3^n$ input terminals of the said ternary output circuit 3; $3^n \times 3^n$ inverted output terminals of the said ternary PUF unit are in corresponding connection with $3^n \times 3^n$ inverted input terminals of the said ternary output circuit.

Work flow of the ternary PUF unit according to the present invention is stated as follows: the ternary excitation signal ($C_0 C_1 C_2 \ldots C_{n-1}$) selects a row of ternary PUF units in array 4 of the ternary PUF unit through the ternary column decoder to control the operation of PUF circuit from the enabling signal EN input from the ternary PUF unit; when the word-line control signal W as input from the word-line control signal input terminal of the ternary PUF unit is at high level, the ternary output circuit will output ternary response signal.

In the ternary PUF circuit, array 4 of the ternary PUF unit with the same numbers of units can store more information as compared with array of the binary unit, which can increase the information storage density. Meanwhile, the ternary excitation signal ($C_0 C_1 C_2 \ldots C_{n-1}$) uses the ternary row decoder 1 and ternary column decoder2 for input; corresponding decoding output of $\log_3(2^n)$ ternary excitation signal is identical to corresponding decoding output of n binary excitation signal; the circuit wiring area has been significantly reduced as compared with that of the binary decoder. For n binary PUF circuit, the number of challenge-response pairs is $2^n$; whereas, in the n ternary PUF circuit, the number of challenge-response pairs is $3^n$; as compared with conventional binary PUF circuit, the number of challenge-response pairs of ternary PUF circuit is to be increased as per multiples of the $(1.5)^n$ exponential function accompanied by increase in the number of PUF circuits. As a result of it, safety of PUF circuit can be improved through increasing the number of challenge-response pairs. Better randomness of PUF circuit can improve the encryption safety, and enhance the capability in defense of attacks. In the ternary PUF circuit, randomness refers to the fact that probability for output of logic value "0", "1" and "2" is equal for each response signal. Randomness of ternary PUF circuit is determined through measurement of percentage of logic value of the output response. In an ideal situation, percentage of logic value "0", "1" and "2" of output response is 33.3% respectively. When ternary signal with 5-bit excitation is input, output of ternary decoder will be 243 bits.

Figure 5:
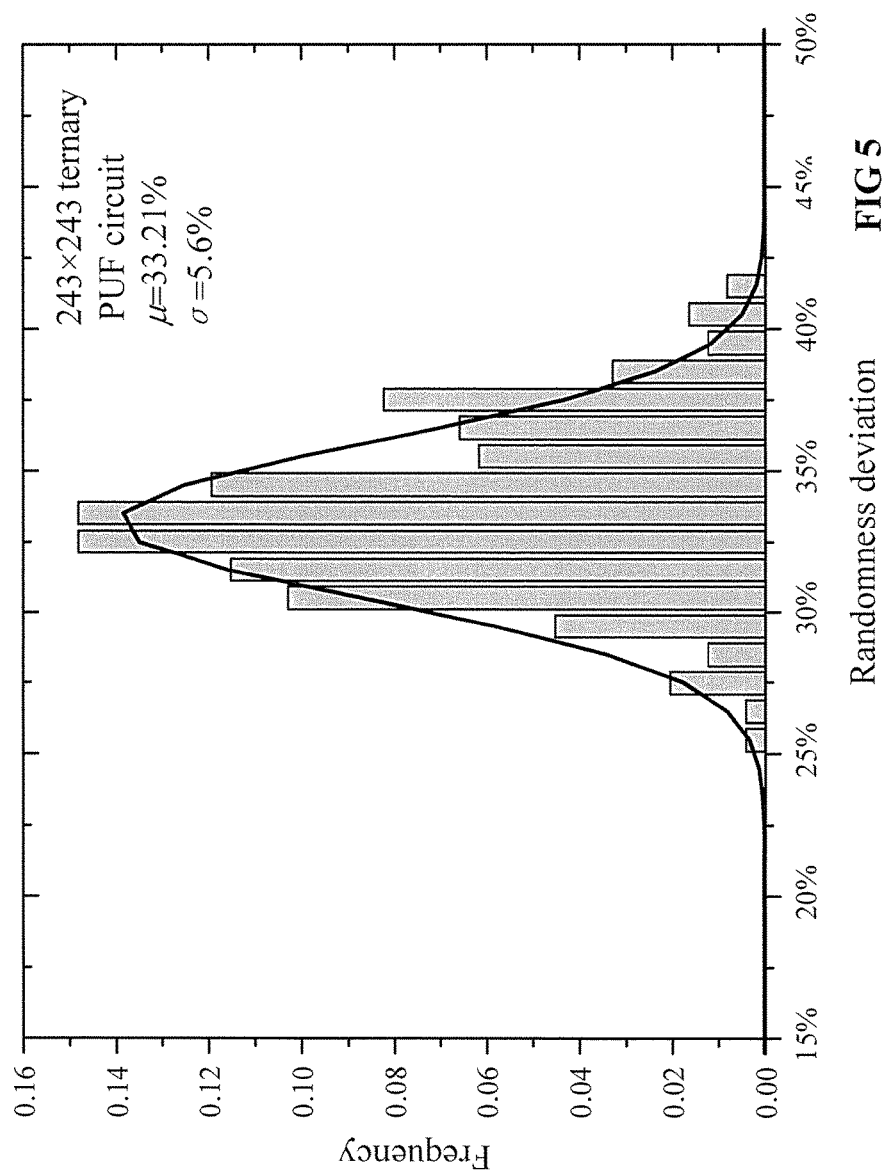
FIG. 5 is the random distribution chart for 234-bit output response of the ternary PUF circuit realized by CNFET according to the present invention.

Randomness distribution chart of 243-bit output response of the ternary PUF circuit realized by CNFET according to the present invention is as shown in FIG. 5; taking logic value "1" for instance, as indicated by FIG. 5, randomness of the ternary PUF circuit realized by CNFET according to the present invention subjects to the Gaussian distribution with expectation value and standard variations up to 33.21% and 5.6% respectively.

Figure 6:
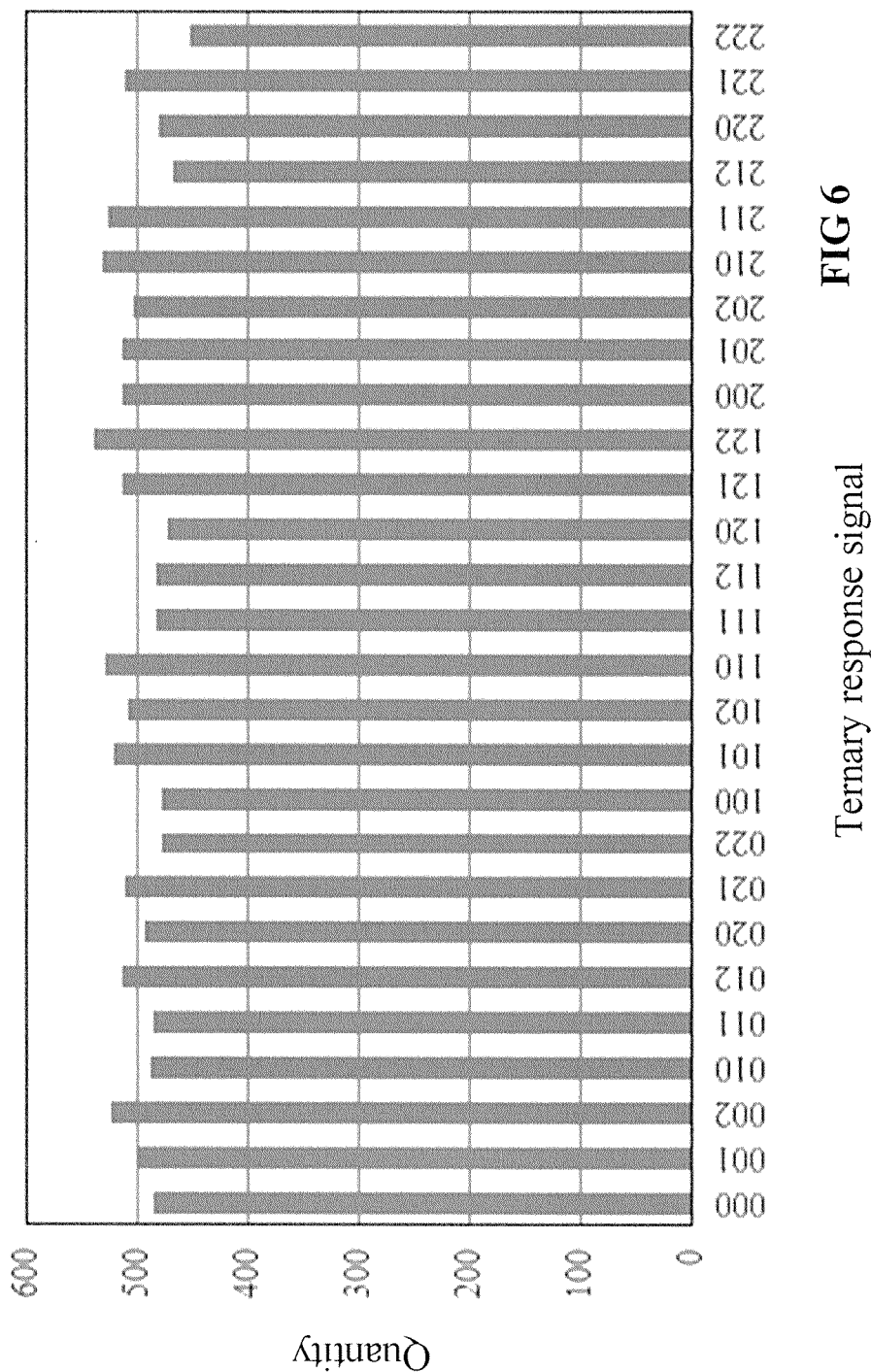
FIG. 6 shows 27 probable value taking charts for 3-bit output response of the ternary PUF circuit realized by CNFET according to the present invention.

27 probable values for 3-bit output response of the ternary PUF circuit realized by CNFET according to the present invention are as shown in FIG. 6; it is obtained through HSPICE simulation and calculation of data that probability for continuous three-bit output response is almost identical. As the expectation value of 33.21% as shown in FIG. 5 is almost equal to the ideal one of 33.3%, and 27 probable values as shown in FIG. 6 are almost equal, it can be inferred that the ternary PUF circuit according to the present invention has excellent randomness.

As compared with binary PUF circuit, ternary PUF circuit has more logic values. Therefore, randomness variations is to be normalized in case of comparison of binary PUF circuit with ternary PUF circuit. Normalized randomness variations is $R_u = |R_r - R_i|/d$. Wherein, $R_u$ refers to normalized randomness variations; $R_r$ refers to measured randomness variations value; $R_i$ refers to ideal randomness variations; d refers to logic base. Data on comparison of randomness variations to the ternary PUF circuit according to the present invention and conventional binary PUF circuit is as shown in Table 1.

TABLE 1

A Comparison of Randomness Variations to the Present Invention and Conventional binary PUF Circuit

|  | Process | Type | Measured randomness variations value % | Normalized randomness variations % |
| --- | --- | --- | --- | --- |
| Literature 1 | 45 nm CMOS | Arbiter-PUFs | 50.1 | 0.05 |
| Literature 2 | 180 nm CMOS | Arbiter-PUFs | 65.6 | 7.8 |
| Literature 3 | 65 nm CMOS | DeMUX-PUFs | 59.8 | 4.9 |
| Literature 4 | 130 nm CMOS | SRAM-PUFs | 51.2 | 0.6 |
| Literature 5 | 90 nm CMOS | SRAM-PUFs | 53.8 | 1.9 |
| The present invention | 32 nm CNFET | SRAM-PUFs | 33.2 | 0.03 |

In Table 1, Literature 1 refers to the binary PUF circuit disclosed by literature "VIJAYAKUMAR A, KUNDU S. A Novel Modeling Attack Resistant PUF Design Based on Non-linear Voltage Transfer Characteristics[C]. 2015 Design, Automation&Test in Europe Conference&Exhibition. EDA Consortium. 2015:653-658."; Literature 2 refers to the binary PUF circuit disclosed by literature "LIM D, LEE J W, GASSEND B, et al. Extracting Secret Keys from Integrated Circuits[J]. IEEE Transaction on Very Large Scale Intergration Systems. 2004, 13 (10):1200-1205."; Literature 3 refers to the binary PUF circuit disclosed by literature "LAO Y, PARHI K K. Statistical Analysis of MUX-Based Physical Unclonable Functions[J]. IEEE Transaction on Computer-Aided Design of Integrated Circuits and Systems. 2014, 33 (5):649-662."; Literature 4 refers to the binary PUF circuit disclosed by literature "SU Y, HOLLEMAN J, OTIS B P. A Digital 1.6 pJ/bit Chip Identification Circuit Using Process Variations [J]. IEEE Journal of Solid-State Circuits. 2008, 43(1):69-77."; Literature 5 refers to the binary PUF circuit disclosed by literature "CHELLAPPA S, CLARK L T. SRAM-Based Unique Chip Identifier Techniques[J]. IEEE Transactions on Very Large Scale Integration Systems. 2016, 24(4):1213-1222."; viewing from Table 1, it can be seen that the ternary PUF circuit according to the present invention has the minimum normalization variations and high randomness.

Better uniqueness of PUF circuit means higher unclonability and safer circuit. Uniqueness can be represented by average Inter-Hamming Distances ($HD_{Inter}$). Measurement of $HD_{Inter}$ aims to impose the same excitation to different chips under the same condition; each chip is to be provided with specific output response for measurement of average Inter-Hamming Distances ($HD_{Inter}$) of such output response. Ideally, uniqueness of the ternary PUF circuit is 66.66%.

Figure 7:
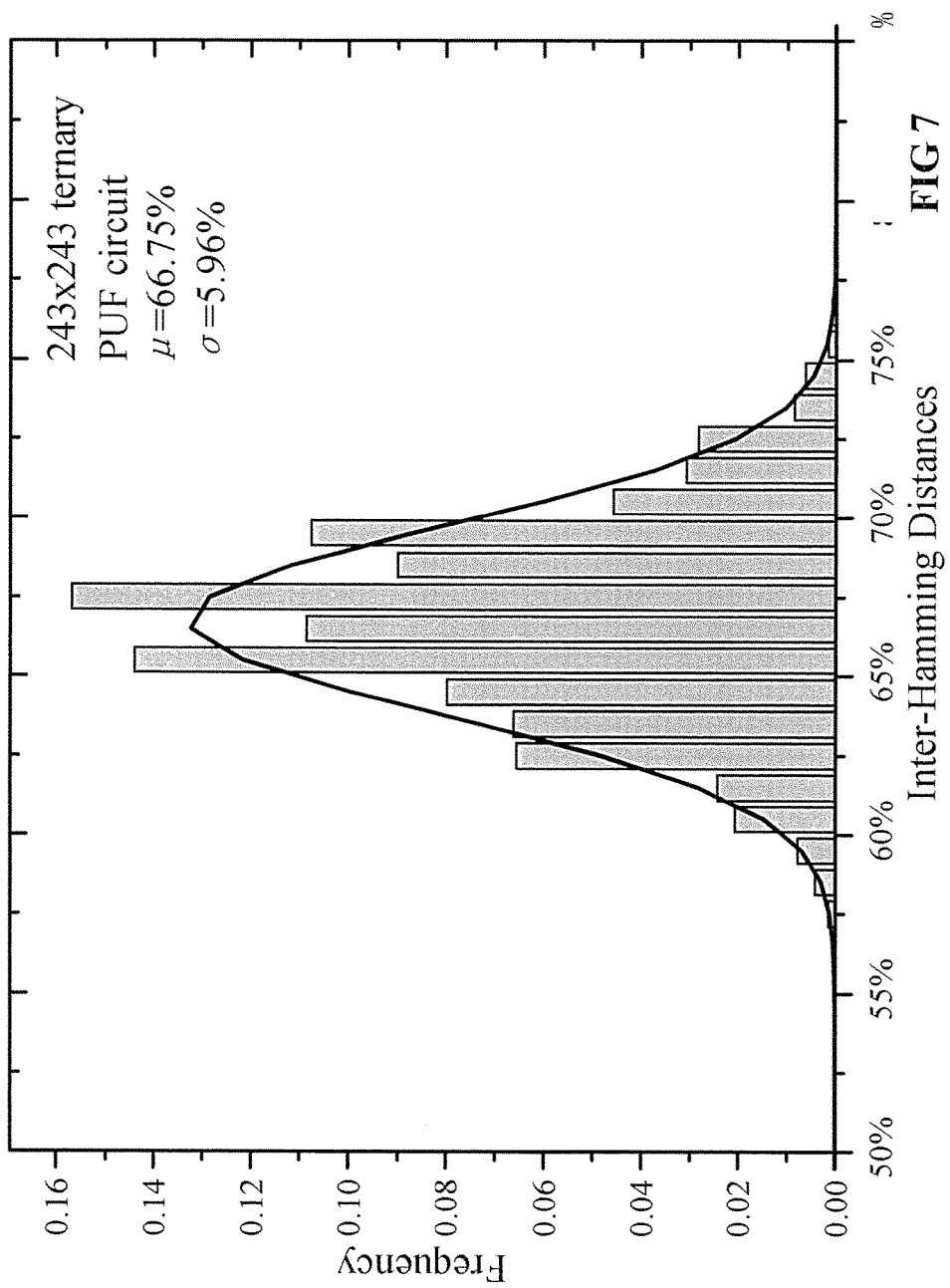
FIG. 7 is the distribution chart for the inter Hamming Distances of the ternary PUF circuit realized by CNFET according to the present invention.

The ternary PUF circuit realized by the CNFET according to the present invention makes use of Monte Carlo for simulation, of which distribution of Inter-Hamming Distances is as shown in FIG. 7. Viewing from FIG. 7, it can be seen that expectation value of Inter-Hamming Distances of the ternary PUF circuit according to the present invention is 66.75% with standard variations up to 5.96%. The expectation value is extremely approximate to the ideal value; on this account, the ternary PUF circuit according to the present invention is provided with excellent uniqueness.

Similarly, as compared with uniqueness of binary PUF circuit, uniqueness of ternary PUF circuit requires further normalization. Normalized uniqueness is $U_u=|U_r-U_i|/d$. Wherein, $U_u$ refers to normalized randomness; $U_r$ refers to measured randomness value; $U_i$ refers to ideal randomness value; d refers to logic base. Data on comparison of randomness variations to the ternary PUF circuit according to the present invention and conventional binary PUF circuit is as shown in Table 2.

TABLE 2

A Comparison of Uniqueness Variations to the Present Invention and Conventional binary PUF Circuit

| | Process | Type | Uniqueness measurement value % | Normalized uniqueness % |
|---|---|---|---|---|
| Literature 1 | 45 nm CMOS | Arbiter-PUFs | 49.80 | 0.1 |
| Literature 4 | 130 nm CMOS | SRAM-PUFs | 50.50 | 0.25 |
| Literature 5 | 90 nm CMOS | SRAM-PUFs | 49.66 | 0.17 |
| Literature 6 | 90 nm CMOS | Arbiter-PUFs | 46.14 | 1.93 |
| Literature 7 | 65 nm CMOS | RO-PUFs | 50.42 | 0.21 |
| The Present Invention | 32 nm CNFET | SRAM-PUFs | 66.75 | 0.03 |

In Table 2, Literature 1 refers to the binary PUF circuit disclosed by literature "VIJAYAKUMAR A, KUNDU S. A Novel Modeling Attack Resistant PUF Design Based on Non-linear Voltage Transfer Characteristics[C]. 2015 Design, Automation&Test in Europe Conference&Exhibition. EDA Consortium 2015:653-658."; in table 2, Literature 4 refers to the binary PUF circuit disclosed by the literature "1SU Y, HOLLEMAN J, OTIS B P. A Digital 1.6 pJ/bit Chip Identification Circuit Using Process Variations[J]. IEEE Journal of Solid-State Circuits. 2008, 43(1):69-77." in table 2, Literature 5 refers to the binary PUF circuit disclosed by the literature "CHELLAPPA S, CLARK L T. SRAM-Based Unique Chip Identifier Techniques[J]. IEEE Transactions on Very Large Scale Integration Systems. 2016, 24(4):1213-1222." in table 2, Literature 6 refers to the binary PUF circuit disclosed by the literature "SUH G E, DEVADAS S. Physical Unclonable Functions for Device Authentication and Secret Key Generation[C]. 2007 IEEE Design Automation Conference. 2007:9-14." in table 2, Literature 7 refers to the binary PUF circuit disclosed by the literature "CAO Y, ZHANG L, CHANG C H, et al. A Low-Power Hybrid RO PUF with Improved Thermal Stability for Lightweight Applications [J]. IEEE Transaction on Computer-Aided Design of Integrated Circuits and Systems. 2015, 34 (7):1-5."

Viewing from Table 2, it can be seen that the ternary PUF circuit according to the present invention has the minimum normalized uniqueness after normalization; the uniqueness is extremely high.

What is claim is:

1. A Carbon Nanotube Field Effect Transistor (CNFET) based ternary Physical Unclonable Function (PUF) unit, comprising: a $1^{st}$ CNFET transistor, a $2^{nd}$ CNFET transistor, a $3^{rd}$ CNFET transistor, a $4^{th}$ CNFET transistor, a $5^{th}$ CNFET transistor, a $6^{th}$ CNFET transistor, a $7^{th}$ CNFET transistor, an $8^{th}$ CNFET transistor, a $9^{th}$ CNFET transistor and a $10^{th}$ CNFET transistor; wherein the $1^{st}$ CNFET transistor, the $3^{rd}$ CNFET transistor, the $4^{th}$ CNFET transistor, the $5^{th}$ CNFET transistor, the $7^{th}$ CNFET transistor and the $8^{th}$ CNFET transistor are N CNFET transistors; and the $2^{nd}$ CNFET transistor, the $6^{th}$ CNFET transistor, the $9^{th}$ CNFET transistor and the $10^{th}$ CNFET transistor are P CNFET transistors;

wherein a gate of the $1^{st}$ CNFET transistor is connected to a gate of the $8^{th}$ CNFET transistor which forms a first connecting terminal, and the first connecting terminal is a numerical line control signal input terminal of the said ternary PUF unit;

wherein a drain of the $1^{st}$ CNFET transistor, a gate of the $2^{th}$ CNFET transistor, a gate of the $3^{rd}$ CNFET transistor, a source of the $5^{th}$ CNFET transistor, a drain of the $6^{th}$ CNFET transistor and a drain of the $7^{th}$ CNFET transistor are connected to a drain of the $9^{th}$ CNFET transistor;

wherein a source of the $1^{st}$ CNFET transistor is an inverted output of the said ternary PUF unit;

wherein a source of the $2^{nd}$ CNFET transistor, a source of the $9^{th}$ CNFET transistor, a source of the $10^{th}$ CNFET transistor, a source of the 6$^{th}$ CNFET transistor and a gate of the 4$^{th}$ CNFET transistor is connected to a gate of the 5$^{th}$ CNFET transistor which forms a second connecting terminal, and the second connecting terminal is connected to a 1$^{st}$ power source;

wherein a drain of the 2$^{nd}$ CNFET transistor, a drain of the 3$^{rd}$ CNFET transistor, a source of the 4$^{th}$ CNFET transistor, a drain of the 10$^{th}$ CNFET transistor, a gate of the 6$^{th}$ CNFET transistor and a gate of the 7$^{th}$ CNFET transistor is connected to a drain of the 8$^{th}$ CNFET transistor;

wherein a source of the 3$^{rd}$ CNFET transistor and a source of the 7$^{th}$ CNFET transistor are grounded;

wherein a drain of the 4$^{th}$ CNFET transistor is connected to a drain of the 5$^{th}$ CNFET transistor which forms a third connecting terminal, and the third connecting terminal is connected to a 2$^{nd}$ power source; wherein the 2$^{nd}$ power source is equivalent to half of the 1$^{st}$ power source;

wherein a source of the 8$^{th}$ CNFET transistor is an output terminal of the said ternary PUF unit;

wherein a gate of the 9$^{th}$ CNFET transistor is connected to a gate of the 10$^{th}$ CNFET transistor which forms a fourth connecting terminal, and the fourth connecting terminal is an enabling terminal of the said ternary PUF unit.

2. A CNFET based ternary PUF circuit, comprising: a ternary row decoder, a ternary column decoder, a ternary output circuit and a ternary PUF unit array;

the said ternary PUF unit array comprises 3$^n$×3$^n$ ternary PUF units arranged in a 3$^n$ rows×3$^n$ columns matrix; wherein n is an integral greater or equal to one;

wherein the said ternary row decoder is provided with n input terminals and 3$^n$ output terminals;

wherein the said ternary column decoder is provided with n input terminals and 3$^n$ output terminals;

wherein the said ternary output circuit is provided with 3$^n$×3$^n$ input terminals, 3$^n$×3$^n$ inverted input terminals and 2×3$^n$ output terminals;

wherein each of the said ternary PUF unit comprises a 1$^{st}$ CNFET transistor, a 2$^{nd}$ CNFET transistor, a 3rd CNFET transistor, a 4$^{th}$ CNFET transistor, a 5$^{th}$ CNFET transistor, a 6$^{th}$ CNFET transistor, a 7$^{th}$ CNFET transistor, an 8$^{th}$ CNFET transistor, a 9$^{th}$ CNFET transistor and a 10$^{th}$ CNFET transistor; wherein the 1$^{st}$ CNFET transistor, the 3$^{rd}$ CNFET transistor, the 4$^{th}$ CNFET transistor, the 5$^{th}$ CNFET transistor, the 7$^{th}$ CNFET transistor and the 8$^{th}$ CNFET transistor are N CNFET transistors; and the 2$^{nd}$ CNFET transistor, the 6$^{th}$ CNFET transistor, the 9$^{th}$ CNFET transistor and the 10$^{th}$ CNFET transistor are P CNFET transistors;

wherein a gate of the 1$^{st}$ CNFET transistor is connected to a gate of the 8$^{th}$ CNFET transistor which forms a fifth connecting terminal, and the fifth connecting terminal is a numerical line control signal input terminal of the said ternary PUF unit;

wherein a drain of the 1$^{st}$ CNFET transistor, a gate of the 2$^{nd}$ CNFET transistor, a gate of the 3$^{th}$ CNFET transistor, a source of the 5$^{th}$ CNFET transistor, a drain of the 6$^{th}$ CNFET transistor and a drain of the 7$^{th}$ CNFET transistor is connected to a drain of the 9$^{th}$ CNFET transistor;

wherein a source of the 1$^{st}$ CNFET transistor is an inverted output terminal of the said ternary PUF unit;

wherein a source of the 2$^{nd}$ CNFET transistor, a source of the 9$^{th}$ CNFET transistor, a source of the 10$^{th}$ CNFET transistor, a source of the 6$^{th}$ CNFET transistor and a gate of the 4$^{th}$ CNFET transistor are connected to a gate of the 5$^{th}$ CNFET transistor which forms a sixth connecting terminal, and the sixth connecting terminal is connected to a 1$^{st}$ power source;

wherein a drain of the 2$^{nd}$ CNFET transistor, a drain of the 3$^{rd}$ CNFET transistor, a source of the 4$^{th}$ CNFET transistor, a drain of the 10$^{th}$ CNFET transistor, a gate of the 6$^{th}$ CNFET transistor and a gate of the 7$^{th}$ CNFET transistor are connected to a drain of the 8$^{th}$ CNFET transistor;

wherein a source of the 3$^{rd}$ CNFET transistor and a source of the 7$^{th}$ CNFET transistor are grounded;

wherein a drain of the 4$^{th}$ CNFET transistor is connected to a drain of the 5$^{th}$ CNFET transistor which forms a seventh connecting terminal, and the seventh connecting terminal is connected to a 2$^{nd}$ power source; the 2$^{nd}$ power source is equivalent to half of the power source;

wherein a source of the 8$^{th}$ CNFET transistor is an output terminal of the said ternary PUF unit;

wherein a gate of the 9$^{th}$ CNFET transistor is connected to a gate of the 10$^{th}$ CNFET transistor which forms an eighth connecting terminal, and the eighth connecting terminal is an enabling terminal of the said ternary PUF unit; a numerical line control signal input terminal of the said ternary PUF unit in row j is connected to an output terminal j of the said ternary row decoder; a numerical line control signal input terminal of the said ternary PUF unit in column j is connected to an output terminal j of the said ternary column decoder, wherein j=1, 2, . . . , 3$^n$;

wherein 3$^n$×3$^n$ output terminals of said ternary PUF unit are in corresponding connection with 3$^n$×3$^n$ input terminals of the said ternary output circuit; and 3$^n$×3$^n$ inverted output terminals of the said ternary PUF unit are in corresponding connection with 3$^n$×3$^n$ inverted input terminals of the said ternary output circuit.

* * * * *